(12) United States Patent
Dean

(10) Patent No.: US 11,094,349 B2
(45) Date of Patent: Aug. 17, 2021

(54) EVENT SOURCE CONTENT AND REMOTE CONTENT SYNCHRONIZATION

(71) Applicant: Tagmix Limited, London (GB)

(72) Inventor: Andy Dean, London (GB)

(73) Assignee: Tagmix Limited, London (GB)

( * ) Notice: Subject to any disclaimer, the term of this patent is extended or adjusted under 35 U.S.C. 154(b) by 19 days.

(21) Appl. No.: 16/484,379

(22) PCT Filed: Feb. 7, 2018

(86) PCT No.: PCT/GB2018/000022
§ 371 (c)(1),
(2) Date: Aug. 7, 2019

(87) PCT Pub. No.: WO2018/146442
PCT Pub. Date: Aug. 16, 2018

(65) Prior Publication Data
US 2020/0234733 A1    Jul. 23, 2020

(30) Foreign Application Priority Data

Feb. 7, 2017   (GB) ...................................... 1702018

(51) Int. Cl.
| | |
|---|---|
| *G11B 27/11* | (2006.01) |
| *G11B 27/031* | (2006.01) |
| *G11B 27/34* | (2006.01) |
| *H04N 21/2187* | (2011.01) |
| *H04N 21/242* | (2011.01) |

(52) U.S. Cl.
CPC ............ *G11B 27/031* (2013.01); *G11B 27/11* (2013.01); *G11B 27/34* (2013.01); *H04N 21/2187* (2013.01); *H04N 21/242* (2013.01)

(58) Field of Classification Search
None
See application file for complete search history.

(56) References Cited

U.S. PATENT DOCUMENTS

| | | | |
|---|---|---|---|
| 9,143,742 B1* | 9/2015 | Amira | H04N 7/181 |
| 2013/0160042 A1* | 6/2013 | Stokes | H04H 60/32 |
| | | | 725/18 |
| 2014/0192200 A1* | 7/2014 | Zagron | G11B 27/11 |
| | | | 348/159 |
| 2015/0016661 A1* | 1/2015 | Lord | H04N 21/2668 |
| | | | 382/100 |

FOREIGN PATENT DOCUMENTS

WO   2015195390 A1   6/2015

* cited by examiner

*Primary Examiner* — Eileen M Adams
(74) *Attorney, Agent, or Firm* — Gable Gotwals

(57) ABSTRACT

A method and apparatus for synchronizing event media content comprising remote audio and video content recorded by a spectator or fan user at an event performance with the remote audio content recorded from the speakers at an event performance, and with source audio content recorded directly from the performance as recorded by a promotor, club or the like. The source audio content has a better quality than the remote audio content recorded by the spectator. The better quality audio source content replaces the lower quality audio content recorded by the spectator. The resulting source audio/remote video media content provides a user's personalized memento of the event with clean studio-clear sound quality audio.

21 Claims, 4 Drawing Sheets

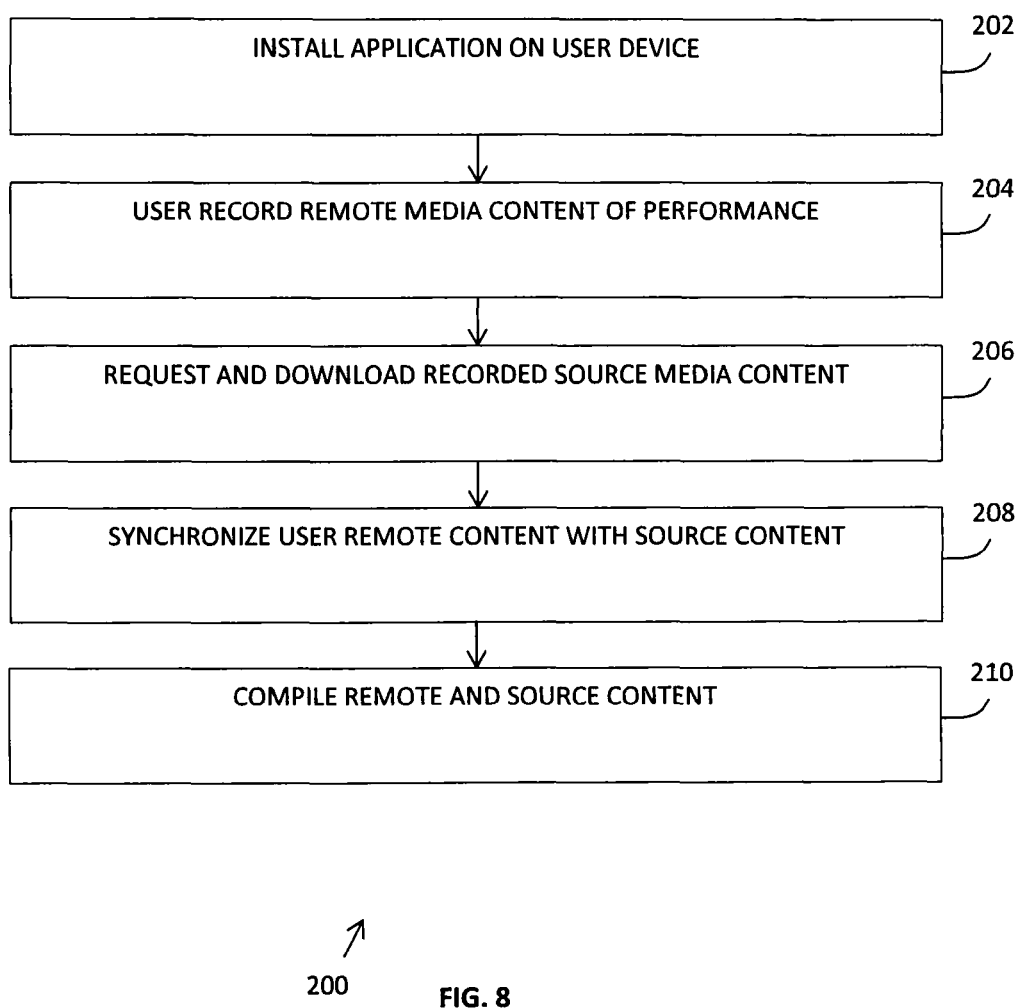

EVENT SOURCE CONTENT AND REMOTE CONTENT SYNCHRONIZATION

CROSS-REFERENCE TO RELATED APPLICATIONS

This United States application is the National Phase of PCT Application No. PCT/GB2018/00022 filed 7 Feb. 2018, which claims priority to British Patent Application No. 1702018.1 filed 7 Feb. 2017, each of which is incorporated herein by reference.

FIELD OF THE INVENTION

This invention relates generally to a method and system of event source content and remote content synchronization, and more particularly, synchronizing higher quality recorded media content of a performance event from a source device directly recording the performance with lower quality recorded media content from a remote device recorded by an audience member at the same event.

BACKGROUND OF THE INVENTION

Audiences are recording live or capturing broadcast event performances on smartphones and other hand held recording devices. These recordings provide the audience members with personalized mementos of the event performance experience. The audience member typically streams, uploads, and posts the remotely recorded video and photograph content to share their experience with others on social networks and video clip capturing and sharing applications. However, usually the remotely recorded media content of the event performance, in particular the sound quality of the audio content, is of such low quality and often so distorted and fragmented that the posted content is inaudible and unwatchable. Some event organizers may provide "official" recordings of the live performances, but these recordings do not record the fans' and spectators' personal perspective, i.e. the video and photograph captions remotely taken by the audience, of the live performance.

There is a need for a method and a system of event source content and audience remote content synchronization of event performances that address or at least alleviates some of the problems and/or limitations discussed above.

SUMMARY OF THE INVENTION

An aspect of the invention is a method of synchronizing event media content comprising remote content having at least a first type and a second type of media recorded by a user on a user device, and source content comprising the first type of media, the method comprising: identifying with identifying means in the data structure of the first type of media remote content recorded by the user; matching the identifying means with associated source content portion; replacing the remote content with the associated source content portion; and compiling the associated source content portion of the first type of media with the remote content of the second type of media recorded by the user.

In an embodiment, the first type of media of the source content is audio, the first type of media recorded by the user is audio and the second type of media recorded by the user is video. A third type of media may be recorded by the user is photograph, and compiling the associated source content portion of the first type of media with the second and third type of media recorded by the user.

In an embodiment, the first type of media of the source content is audio, the first type of media recorded by the user is audio and the second type of media recorded by the user is photograph. The source content may comprise only the first type of media content audio.

In an embodiment, the identifying means may be identified in the data structure of the time and location of the first type of media remote content recorded by the user. The identifying means may be identified in the data structure with tags manually generated by the user of the first type of media remote content recorded by the user.

In an embodiment, multiple users may each have a separate user device for recording first type and second type of media recorded by the associated user attending the same event, compiling the associated source content portion of the first type of media with the remote content of the second type of media content recorded by different users at different times during the duration of the source content.

In an embodiment, the source content is a studio quality recording of the event performance. The remote content may comprise ambient noise of the event performance recording and lower quality recording of the event performance.

An aspect of the invention is a system of synchronizing event media content comprising remote content having at least a first type and a second type of media recorded by a user, and source content comprising the first type of media, the method comprising: a recognition module with identifying means for identifying the first type of media remote content recorded by the user, and matching the identifying means with associated source content portion; a synchronisation module for replacing the remote content with the associated source content portion; and a compiler for compiling the associated source content portion of the first type of media with the remote content of the second type of media recorded by the user.

In an embodiment, the recognition module comprises an identifying module with identifying means in the data structure of the time and location of the first type of media remote content recorded by the user; and a matching module for matching the identifying means with associated source content portion.

In an embodiment, the first type of media of the source content is audio, the first type of media recorded by the user is audio and the second type of media recorded by the user is video. A third type of media may be recorded by the user is photograph, and compiling the associated source content portion of the first type of media with the second and third type of media recorded by the user.

In an embodiment, the first type of media of the source content is audio, the first type of media recorded by the user is audio and the second type of media recorded by the user is photograph. The source content may comprise only the first type of media content audio.

In an embodiment, the identifying means may be identified in the data structure of the time and location of the first type of media remote content recorded by the user. The identifying means may be identified in the data structure with tags manually generated by the user of the first type of media remote content recorded by the user.

In an embodiment, multiple users may each have a separate user device for recording first type and second type of media recorded by the associated user attending the same event, compiling the associated source content portion of the first type of media with the remote content of the second type of media content recorded by different users at different times during the duration of the source content.

In an embodiment, the source content is a studio quality recording of the event performance. The remote content may comprise ambient noise of the event performance recording and lower quality recording of the event performance.

An aspect of the invention is a computer implemented method of synchronizing event media content comprising remote content having at least a first type and a second type of media recorded by a user, and source content comprising the first type of media, the method comprising: identifying with identifying means in the data structure of the time and location of the first type of media remote content recorded by the user; matching the identifying means with associated source content portion; replacing the remote content with the associated source content portion; and compiling the associated source content portion of the first type of media with the remote content of the second type of media recorded by the user.

An aspect of the invention is a user electronic device for a method of synchronizing event media content comprising remote content having at least a first type and a second type of media recorded by a user, and source content comprising the first type of media: a memory storing machine readable instructions; and a processor configured to execute the machine readable instructions to implement the steps of the method in accordance with an embodiment of the invention.

An aspect of the invention is a system of synchronizing event media content comprising remote content having at least a first type and a second type of media recorded by a user, and source content comprising the first type of media: a server having a memory for storing machine readable instructions and a processor configured to execute the machine readable instructions; a first user electronic device having a memory for storing machine readable instructions and a processor configured to execute the machine readable instructions; the server and the first user electronic device being configured to communicate with each other over a network; wherein the server and the first user electronic device interoperate to implement the steps of the method in accordance with an embodiment of the invention.

An aspect of the invention is a computer readable medium storing machine readable instructions executable by a processor of a user electronic device for implementing the steps of the method in accordance with an embodiment of the invention.

A computer readable medium storing machine readable instructions executable by a processor of a server for implementing the steps of the method in accordance with an embodiment of the invention.

BRIEF DESCRIPTION OF THE DRAWINGS

The accompanying drawings incorporated herein and forming a part of the specification illustrate several aspects of the present invention and, together with the description, serve to explain the principles of the invention. While the invention will be described in connection with certain embodiments, there is no intent to limit the invention to those embodiments described. On the contrary, the intent is to cover all alternatives, modifications and equivalents as included within the scope of the invention as defined by the appended claims. In the drawings:

FIG. 8 is a flow chart of a method in accordance with an embodiment of the invention.

DETAILED DESCRIPTION

An embodiment of the invention is a method and apparatus for synchronizing event media content comprising remote audio and video content recorded by a spectator or fan user from the speakers at an event performance, and source audio content recorded directly from the performance as recorded by a promotor, club, music provider, band, or the like. The source audio content has a better acoustic quality than the remote audio content recorded by the spectator. Typically, the remotely recorded media content recorded of the event performance by the user on the user device, such as a smartphone, or the like, in particular the sound quality of the audio content, is of such low quality and often so distorted and fragmented that the recorded remote content is inaudible and unwatchable. The user device acoustic recording means for recording the remote content is typically far inferior to the sound recording equipment quality used for recording the source content. The better quality audio source content replaces the lower quality audio remote content recorded by the user spectator, and is synchronized and layered with the video remote content recorded by the user. The resulting event source audio/remote video media content provides a user's personalized account or momento of the event with clean studio-clear sound quality audio.

Figure 1:
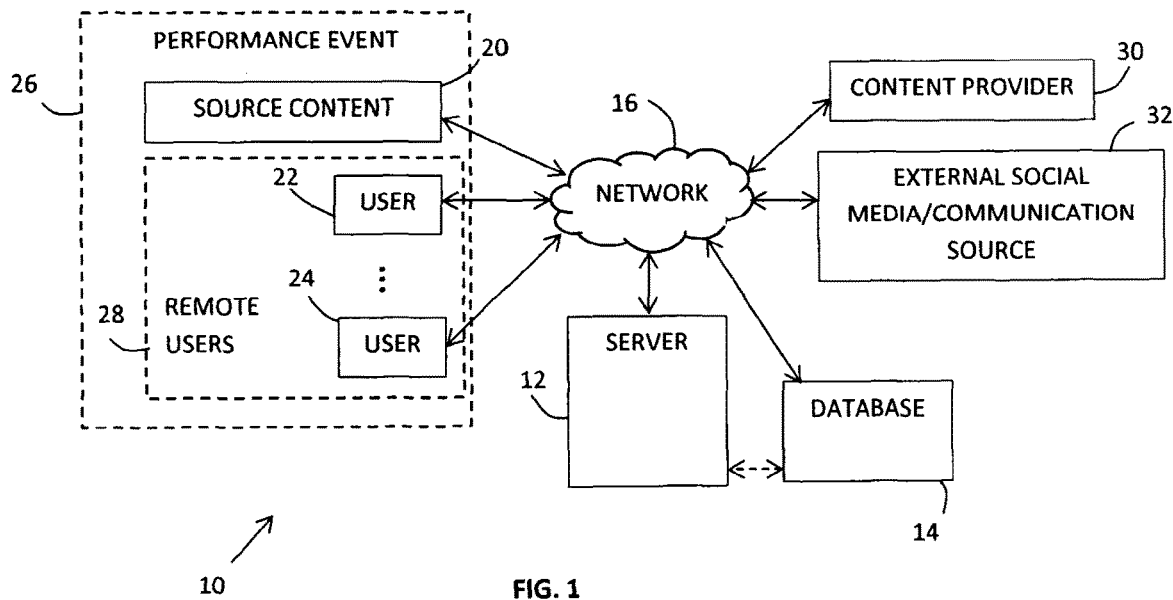
FIG. 1 shows a schematic block diagram of a system in accordance with an embodiment of the invention.

Referring to FIG. 1, a schematic block diagram 10 is shown of a system in accordance with an embodiment of the invention. The event source content and remote content synchronization system 10 shows a server 12 with a database 14 in communication via a network 16, such as the internet, local area network, or the like, with source content 20 and at least one user 22,24 or a plurality of users 28. The users 22 record the event performance 26. The event performance may be a live event, or a broadcast live event. The event performance may be a broadcast of a previously recorded event. In an embodiment, the source content 20 may be streamed live or recorded live at the event. The source content may be recorded music tracks recorded at a studio and played or broadcast at the event, on the radio, or the like. The user may capture the broadcast of the music track in the background while recording video on the user device. Content providers 30 may provide the source content that is a higher sound quality than the remote content recorded by the user. Content providers may provide additional material that may be relevant to the performance, such as other media content, such as text, audio content, images, photographs, video, video clips and the like. External social media/communication source 32 is shown in communication via the network to upload and share content.

Figure 2:
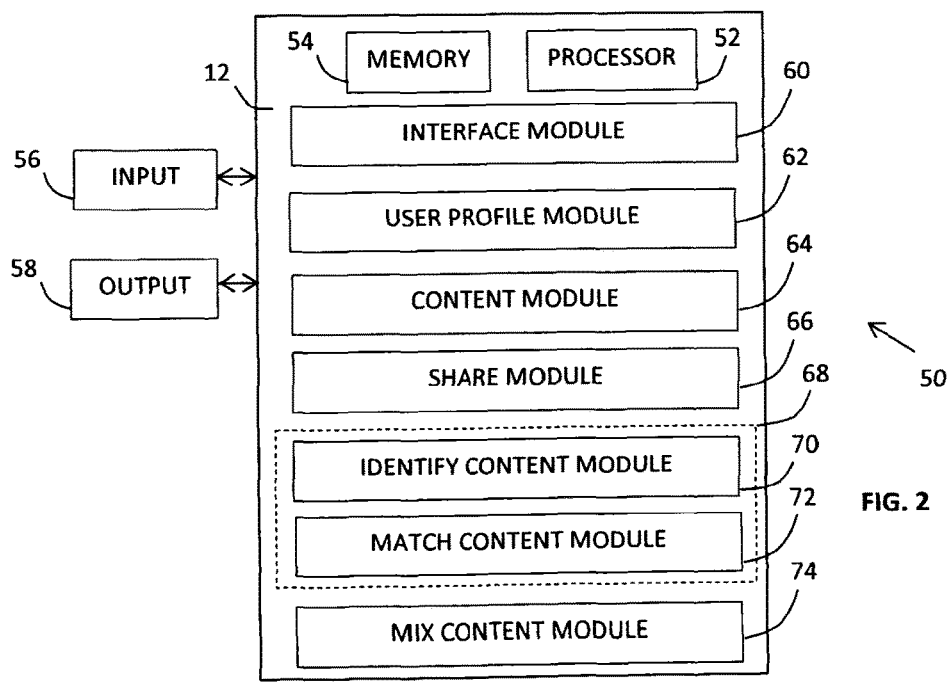
FIG. 2 shows a schematic block diagram of a server as shown in FIG. 1 in more detail in accordance with an embodiment of the invention.

FIG. 2 shows a schematic block diagram 50 of a server 12 as shown in FIG. 1 in more detail in accordance with an embodiment of the invention. The server 12 comprises a processor 52 and a memory 54 for storing and executing the applications and processing the different modules of the applications of the system. The server may comprise an input means 56 and output means 58, and an interface module 60 for communicating with different modules and devices of the system. The modules of the server may comprise a user profile module 62 for maintaining user profile accounts of the users, a content module 64 for managing the content of performances, a share module 66 to share the source content of the module with users, a recognition module 68 comprising an identify content module 70 to identify the remote content and a match content module 72 to match the remote content with source content, and a mix module 74 to replace, overlay, or the like, the unclear audio remote content with the clearer audio source content with the other media video remote content.

Figure 3:
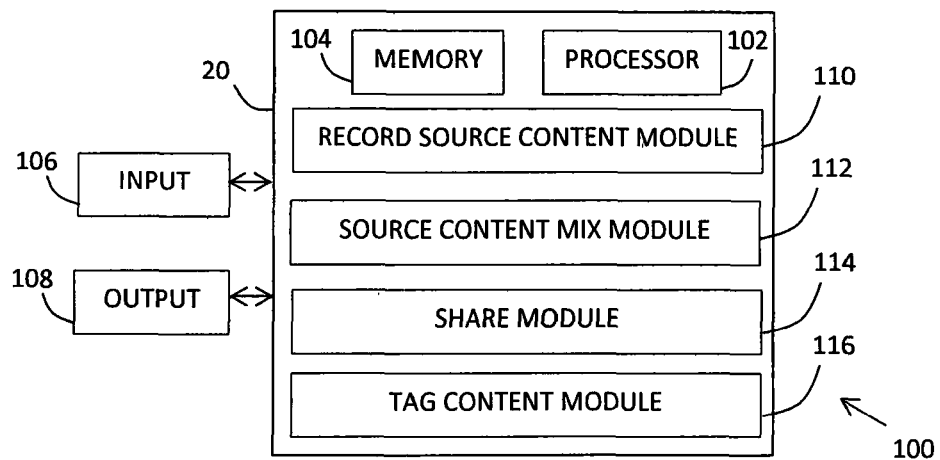
FIG. 3 shows a schematic block diagram of a source recording device as shown in FIG. 1 in more detail in accordance with an embodiment of the invention.

FIG. 3 shows a schematic block diagram 100 of a recording device of the source content 20 as shown in FIG. 1 in more detail in accordance with an embodiment of the invention. The recording device of the source content 20 comprises a processor 102 and a memory 104 for storing and executing the source content of the performance and processing the different modules of the source content recording device 20. The recording device of the source content may comprise an input means 106 and output means 108, and a record source content module 110 for recording the source content, source content mix module 112 for mixing source content if required, a share module 114 for sharing the source content with users, and a tag content module 116 to tag the content to allow synchronization of the content. It will be appreciated that the storage of the source content may be stored in storage residing on the source content recording device itself, somewhere remote to the source content recording device, such as the server 12, database 14, content provider storage 30, external social media/communication source 32, cloud storage (not shown), other remote storage, or the like. The recording device of the source content records the performance content directly from the event performance, or in other words, in a more direct manner than compared with the remote user device. For example, the source content recording device may comprise direct link hook up to the output of the performers' digital output of electronic music sequencers, synthesizers, audio output of instruments, or the like, or sensitive high specification analog/digital microphones positioned in close proximity to the performers and/or instruments, or the like, to provide a substantially higher sensitivity and higher quality recording than ever achievable with a remote user's recording device. The source content of the event performance may be recorded live and broadcast in real time, live streamed event, or broadcast at a later time after the live event. The source content may be recorded on stage, in a recording studio, or the like. The source content may be broadcast by some broadcast means, such as a concert venue, radio station, night club, cinema, concert house, theatre, concert, or the like. The source content of the performance event may be broadcast anywhere on a speaker system, and the user with the user device records or captures the remote content from the output of the speakers. The source content recording may be adjusted by filters, sound engineering equipment, and the like to improve the quality of the source content recording. In contrast, the user remote recording device is typically remote from the performers between the speakers of the performance event picking up interfering surrounding sounds, distortion, feedback and the like. Accordingly, the source content recorded achieves a much a higher quality level than the lower quality achievable with the user device.

Figure 4:
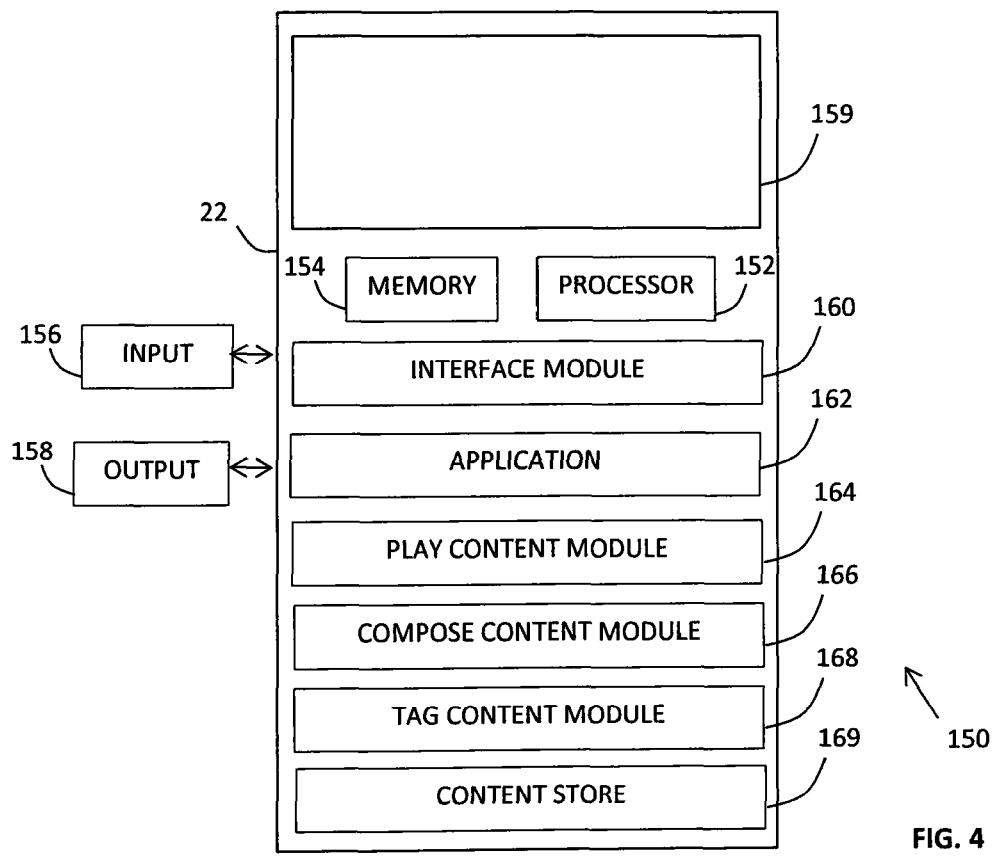
FIG. 4 shows a schematic block diagram of a user device recording device as shown in FIG. 1 in more detail in accordance with an embodiment of the invention.

FIG. 4 shows a schematic block diagram 150 of a user device recording device 22 as shown in FIG. 1 in more detail in accordance with an embodiment of the invention. The user device 22 comprises a processor 152 and memory 154 for storing and executing the applications and processing the different modules of the user device and applications of the system, and a user interface module for communicating with different modules and devices of the system and the user. The user device 22 may comprise input 156 and output 158 means for the user to enter and retrieve commands and information of the system and for communicating with different modules and devices of the system. The input means 156 may comprise a microphone, a video camera, and the like. The output means may comprise of display 159, a speaker, and the like, and the user device modules may comprise an application 162 module for running the method and system in accordance with an embodiment of the invention, a play content module 164 for playing the media content on the user device, a compose content module 166 for the user to compose and share media content originating from the user device, manage content and tag module 168 for storing and maintaining the media content resident on the user device in content store or storage area 169, or the like. It will be appreciated that the storage of the remote content and/or source content may be stored in storage residing on the user device itself in content store 169, somewhere remote to the user device, such as the server 12, database 14, content provider storage 30, external social media/communication source 32, cloud storage (not shown), other remote storage, or the like. The interaction of the different modules 60,62,64,66 of the server 12, modules 110,112,114,116 of the source content recording device 20, and of modules 160,162,164,166,168 of the user device 22 is described in more detail with reference to FIG. 5-8.

Figure 5:
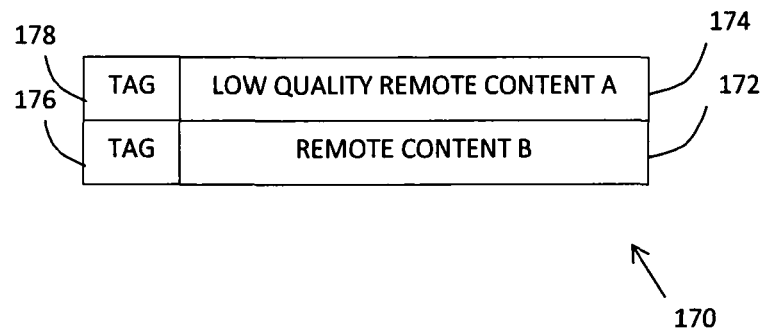
FIG. 5-7 show schematic diagrams of data structures of remote media content compiled with source media content.
Figure 6:
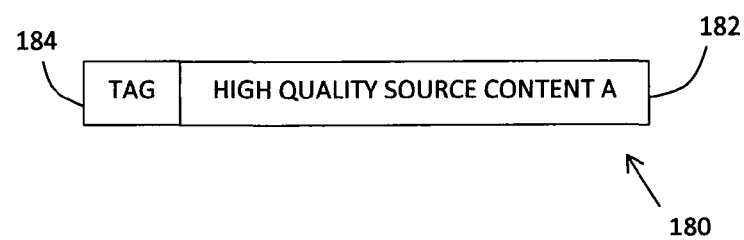
Figure 7:
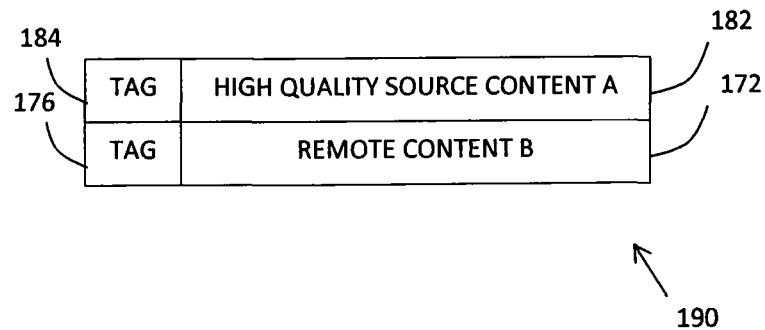

FIG. 5-7 show schematic diagrams of data structures 170,180,190 of remote content and source content. More specifically, FIG. 5 shows a schematic diagram 170 of a data structure of remote media content recorded by user at an event performance. The data structure of the remote media content 170 comprises a layered or dual media content, i.e., remote content B 172 layer, and remote content A 174 layer. Remote content B 172 may be the video portion of the remote media content, while the remote content A 174 may be the audio portion of the remote media content. Each portion comprises a tag 176,178, metadata, or the like, comprising identifying means, identifying data, or the like, to allow synchronization of the remote and source data. For example, the embedded identifying data tag or metadata container may comprise ID3 metadata, geodata or geographical location data with latitude and longitude coordinates, time stamp data, artist name, song or track name, genre, album title, album track number, release date, and the like to identify the multimedia audio and/or video content Referring to FIG. 6, the data structure 180 shows the high quality source content A 182 and associated tag 184 of the source media content recorded and captured by the performer source recording device.

Referring to FIG. 7, the resulting matched data structure 190 is shown of the remote media content B 172 layer with associated tag 176 of FIG. 5 compiled, embedded, and layered with the high quality source content A 182 layer with associated tag 184 of FIG. 6. The low quality remote content A 174 of FIG. 5 is stripped from the data structure 170 of the remote media content recorded by the user, and replaced by the higher quality source content A with associated tag 184 of FIG. 6. This results in a data structure 190 having a dual data structure with some remote content captured by the user, and some source content captured by the performer source recording device. In this embodiment, the remote content B 172 may be video content, and the remote content A 174 and source content A 182 may be audio. It will be appreciated that the content may be other forms of media content, such as photographs, video, audio, and the like.

The tags 176,178,184 provide identifying means to enable the synchronisation of the content. For example, the tags in this embodiment identify the time and geo location which identifies the event performance, and the part of the performance recorded. This information is critical to accurately, identify, match, and synchronise the high quality source content with the remote content. For example, in some performance venues, such as multi-stage music festivals or electric music club venues, there may be several acts occurring at the same time at different stages or rooms. Therefore, in such a scenario, the geo location accuracy is sufficient to differentiate between venue stages or rooms. It will be appreciated that other forms of identifying means may be used instead of or in addition to time stamp and/or geo location.

Upon the application 162 of the user device 22 communicating the identifying details of the tag 178 of the lower quality remote content A 174 to the server, the higher quality source content A 182 is identified and transmitted to the user device. The higher quality source content A 182 is synchronized with the remote content B 172.

In an embodiment, when the clean audio from a club/promoter, music or track producer, audio track played on the radio, or the like, i.e. source content, is received, there may be a certain amount of associated metadata or tags, both automatically and manually generated. The associated metadata or tags may include additional information such as start and end times, geolocation, name of venue, promoter, event, location, DJ(s), performer(s), theme, music genres, occasion, or the like. As the source content is typically recorded by a music or track producer, event organiser, or the like, the quality of the source content is of high studio-like quality. The remote content recorded by the user is typically recorded from a distance away or remote from the speakers broadcasting the recorded or live streamed content. Accordingly, all outside and inside background ambient noise at the live event performance is also recorded by the user in the remote content.

When a user uploads the remote content, i.e. the video, the audio, and/or fingerprinted data associated with the audio, to the server, then there may also be a certain amount of associated metadata in the remote content recorded by the user generated and embedded by the application running on the recording device of the user device. Some of associated metadata or tags associated with the user remote content may be auto generated, for example, start time, end time, clip length to derive end time, geolocation, time zone, or the like. Additionally, some associated metadata or tags associated with the user remote content may include tags that are manually generated by the user, for example event name, music genres, or the like. The associated metadata may be calculated or derived from the existing auto generated associated metadata, for example, if the geolocation is known from the existing geolocation, the event and venue may be derived if known or matched against known data. In an embodiment, the users' manually generated metadata, such as for example, what the DJ, genre, or the like, is playing to enrich our clean audio data.

In an embodiment, audio or acoustic fingerprint search of the remote content may be used to search a fingerprint database for matching source content. Content databases or storage areas may be searched such as event content database 14, a content provider 30 database, content store 169 storing existing content on the user device 150 the user may already have stored, or the like, to find the correct piece of source content audio to match the remote content audio. It will be appreciated that source content may be searched on any number of storage areas such as content stored in storage residing on the user device itself in content store 169, somewhere remote to the user device, such as the server 12, database 14, content provider storage 30, external social media/communication source 32, cloud storage (not shown), other remote storage, or the like. The stored content in any number of databases and storage areas may be searched to determine if there is a match of a live or known event in event content database 14, or a known track from content providers 30. For example, the remote content recorded by the user may capture music played on the radio, jukebox, or the like, in the background, for example in a car while driving, at a restaurant, or the like. The track is identified and matched. The associated metadata from the user may be used to filter the list of potential audio clips so that it is possible to find the correct clip much quicker, rather than searching through all the existing clips, which may not be relevant.

FIG. 8 is a flow chart of a method 200 in accordance with an embodiment of the invention. The method of the user device installs 202 the application on the user device, and the user records remote media content of a performance 204. The user requests and downloads recorded source media content 206, and the application synchronizes the user remote content with the source content 208. The remote content and the source content are compiled 210.

In an embodiment, the remote media content is identified and matched in a recognition module 68 with stored music tracks. The remote media content or unclean audio content may be identified and matched with source content or clean audio with a finger print type match, or the like. Acoustic fingerprinting processes are used in the industry and may be applied herein with embodiments of the invention. The stored music tracks may be stored in an events database 14 such as live event performances, provided by content providers 30 such recorded audio tracks, or the like. The remote content is identified, and matched with the event performances in the events database and tracks in the content provider databases. For example, the media content may be categorized as a live event with a live event flag, and may match an event performance source content stored in the events database 14. If no matches are found in the events database, and a match may be made in the content provider or music application program interface (API) provider.

In an embodiment, once the clean source audio is compiled and embedded with the user's video, the user may post the user's personal remote content B 172 onto an external social media, video clip capturing and sharing system, and the like, capturing the user's personal moment of the performance taken from the perspective of the user, with the higher quality source content A 182. Another user in the plurality of users 28 shown in FIG. 1, may take several actions within the network and server, such as view the post, comment on the post, follow the user that posted the post, be alerted for similar events in the future, and the like.

In an embodiment, the source audio of an event replaces with the remote audio of the user's event content remote video with the source audio. The source audio is transmitted to the user device, and the application, located on the user device, synchronizes the event content remote video with the source audio. It will be appreciated that the synchronization may occur at other devices within the systems, such as at the server, the user device, and the like. In an embodiment resulting data structure may comprise an mp4 format file, or the like, with just user video on the user device with source audio. It will be appreciated that any playback file or format may be used to be played back on an any number of multi-media play back application to replay the synchronized source audio content with the fans' remote video/photograph content.

In an embodiment, a user's other multi-media event-related content residing on the user device (or other storage associated with the user device) other than the just the video, such as photographs, etc., together with the video and may be synchronized with the source audio. It will be appreciated that even some of the lower quality audio taken by the fans' may be over laid on top of the source audio. This will provide an enhanced personal experience of the audio playback of the source audio with the audio portions of the fan. For example, the fan may want portions of the fan's singing or chanting to be audible with the playback of the source audio. In an embodiment the resulting data structure may comprise an mp4 format file, or the like, with user video and other user multi-media content on the user device with source audio. It will be appreciated that any playback file or format may be used to be played back on any number of multi-media play back applications to replay the synchronized source audio content with the fans' remote video/photograph content.

In an embodiment, a user's video may be compiled with source audio and source multi-media content, such as photographs taken during the performance event. Typically, the photographs may be taken on the same user device that has recorded with video and audio portions of the event, and the photographs may be taken between the videos. The photographs, or other multi-media content, may also have data structures with tags as shown in FIG. 5-7 with geo-location, time stamps, or the like, such that the photographs would be shown for a period of time (for example approximately 1-5 seconds, or the like) during the replay of source audio content and synchronized fans' remote video/photograph and other multi-media content at the specific time the photograph was taken during the performance. In an embodiment the resulting data structure may comprise an mp4 format file, or the like, with user video (and other user multi-media content) on the user device with source audio and source multi-media content provided by the source server. It will be appreciated that any playback file or format may be used to be played back on an any number of multi-media play back applications to replay the synchronized source audio content with the fans' remote video/photograph content.

In an embodiment, multi-user's video in a group of users may be compiled together into a single video with source audio. This may result with an advanced audio coding (AAC), mp4 video format file, or the like, with video and other content, such as video, photos, and the like, from multiple user devices with source audio. The selection of users' video/photograph clips may be chosen at random, or from users within a group of users that have some links between them, i.e. the fans have indicated that they are agreeable to share content with each other within an organized group within the system network of users. It will be appreciated that any playback file or format may be used to be played back on any number of multi-media playback applications to replay the synchronized source audio content with the fans' remote video/photograph content. It will be appreciated that the remote content may be recorded by a user, and the user may be a member of the audience, a performer, a presenter holding the performance, or the like.

In an embodiment, other content from content providers such as promoters, brand material from sponsors, and the like may be compiled together into a single video with the user's content and the source content audio. This might be useful if it may be necessary or convenient to fill any gaps between fans' time stamped video/photograph sequences in the video portion synchronized with the source audio portion, if there are some gaps in the fans' video/photograph during the entire length of the source audio track of the entire event performance.

Embodiments of the invention have been described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by the applicable law. Moreover, any combination of the above-described elements in all possible variations thereof is encompassed by the invention unless otherwise indicated herein or otherwise clearly contradicted by context.

The invention claimed is:

1. A method of replacing low quality spectator device recorded audio content by better-quality source device recorded audio content in media content recorded by the spectator device at an event, said media content recorded by the spectator device comprising synchronized audio content and video content of a part of the event, the method comprising the steps at a server of:
receiving the media content recorded by the spectator device;
based on fingerprint data associated with the audio content of the media content recorded by the spectator device, performing an audio/acoustic fingerprint search in a content database or store to match the audio content in said media content recorded by the spectator device with an associated portion of better-quality source device recorded audio content;
replacing the audio content of the media content recorded by the spectator device with the associated matched portion of better-quality source device recorded audio content; and
compiling the associated matched portion of better-quality source device recorded audio content with the video content of the media content recorded by the spectator device.

2. The method of claim 1 comprising making available said compiled associated matched portion of better-quality source device recorded audio content with the video content of the media content recorded by the spectator device to the spectator or to a user of a system for compiling said associated matched portion of better-quality source device recorded audio content with the video content of the media content recorded by the spectator device.

3. The method of claim 2 wherein the spectator device records images, and the method comprises the server or the spectator device compiling the images with the associated matched portion of better-quality source device recorded audio content and the video content of the media content recorded by the spectator device.

4. The method of claim 1 comprising the server, based on said fingerprint data associated with the audio content of the media content recorded by the spectator device, performing an audio/acoustic fingerprint search in a content database or store to match the audio content in said media content recorded by the spectator device with the associated portion of better-quality source device recorded audio content.

5. The method of claim 4, wherein the content database or store is an audio/acoustic fingerprint database.

6. The method of claim 1 wherein the method comprises the spectator device recording time and location data of the audio content recorded by the spectator device.

7. The method of claim 1 wherein the method comprises the server or the spectator device manually associating tags with the audio content recorded by the spectator device to allow synchronization at the server of the associated matched portion of better-quality source device recorded audio content and the video content of the media content recorded by the spectator device.

8. The method of claim 1 wherein the method comprises multiple users each having a separate spectator device for recording respective synchronized audio content and video content of a part of the event, wherein the method includes repeating the steps of claim 1 for at least one other spectator's respective recorded synchronized audio content and video content of a part of the event.

9. The method of claim 1 wherein the source device recorded audio content is a studio quality recording of the event performance and the spectator device recorded audio content comprises ambient noise of the event performance recording and lower quality recording of the event performance.

10. The method of claim 1, wherein the compiled associated matched portion of better-quality source device recorded audio content with the video content of the media content recorded by the spectator device may be compiled with any one or more of photographs, content from content providers or brand material from sponsors.

11. The method of claim 10, wherein the photographs, content from content providers or brand material from sponsors is used to fill gaps in the video content of the media content recorded by the spectator device.

12. The method of claim 11, wherein the photographs, content from content providers or brand material from sponsors is used to fill any gaps in the video content occurring during a length of the matched portion of better-quality source device recorded audio content.

13. The method of claim 1, wherein the compiled associated matched portion of better-quality source device recorded audio content with the video content of the media content recorded by the spectator device is overlaid with other spectator recorded audio content.

14. A server device for replacing low quality spectator device recorded audio content by better-quality source device recorded audio content in media content recorded by the spectator device at an event, said content recorded by the spectator device comprising synchronized audio content and video content of a part of the event, the server device comprising:
an identity content module which receives the media content recorded by the spectator device and is configured to, based on fingerprint data associated with the audio content of the media content recorded by the spectator device, perform an audio/acoustic fingerprint search in a content database or store to match the audio content in said media content recorded by the spectator device with an associated portion of better-quality source device recorded audio content;
a tag content module configured to replace the audio content of the media content recorded by the spectator device with the associated matched portion of better-quality source device recorded audio content; and
a compose content module configured to compile the associated matched portion of better-quality source device recorded audio content with the video content of the media content recorded by the spectator device.

15. The device of claim 14 wherein the compose content module is configured to make available said compiled associated matched portion of better-quality source device recorded audio content with the video content of the media content recorded by the spectator device to the spectator or to a user of a system for compiling said associated matched portion of better-quality source device recorded audio content with the video content of the media content recorded by the spectator device.

16. The device of claim 15 wherein the compose content module is configured to compile images recorded by the spectator device with the associated matched portion of better-quality source device recorded audio content and the video content of the media content recorded by the spectator device.

17. A non-transitory computer readable medium storing machine-readable instructions executable by a processor of an electronic device for implementing the method of:
replacing low quality spectator device recorded audio content by better-quality source device recorded audio content in media content recorded by the spectator device at an event, said media content recorded by the spectator device comprising synchronized audio content and video content of a part of the event, the method comprising the steps of:
receiving the media content performing an audio/acoustic fingerprint search in a content database or store to match the audio content in said media content recorded by the spectator device with an associated portion of better-quality source device recorded audio content;
replacing the audio content of the media content recorded by the spectator device with the associated matched portion of better-quality source device recorded audio content; and
compiling the associated matched portion of better-quality source device recorded audio content with the video content of the media content recorded by the spectator device.

18. A method of replacing low quality spectator device recorded audio content by better-quality source device recorded audio content in media content recorded by the spectator device at an event, said media content recorded by the spectator device comprising synchronized audio content and video content of a part of the event, the method comprising the steps at a server of:
receiving the media content recorded by the spectator device;
based on fingerprint data associated with the audio content of the media content recorded by the spectator device, matching the audio content in said media content recorded by the spectator device with an associated portion of better-quality source device recorded audio content;
replacing the audio content of the media content recorded by the spectator device with the associated matched portion of better-quality source device recorded audio content; and
compiling the associated matched portion of better-quality source device recorded audio content with the video content of the media content recorded by the spectator device;

wherein the method comprises the server or the spectator device manually associating tags with the audio content recorded by the spectator device to allow synchronization at the server of the associated matched portion of better-quality source device recorded audio content and the video content of the media content recorded by the spectator device.

19. A method of replacing low quality spectator device recorded audio content by better-quality source device recorded audio content in media content recorded by the spectator device at an event, said media content recorded by the spectator device comprising synchronized audio content and video content of a part of the event, the method comprising the steps at a server of:
- receiving the media content recorded by the spectator device;
- based on fingerprint data associated with the audio content of the media content recorded by the spectator device, matching the audio content in said media content recorded by the spectator device with an associated portion of better-quality source device recorded audio content;
- replacing the audio content of the media content recorded by the spectator device with the associated matched portion of better-quality source device recorded audio content; and
- compiling the associated matched portion of better-quality source device recorded audio content with the video content of the media content recorded by the spectator device;
- wherein the method comprises multiple users each having a separate spectator device for recording respective synchronized audio content and video content of a part of the event, wherein the method includes repeating the steps of claim 1 for at least one other spectator's respective recorded synchronized audio content and video content of a part of the event.

20. A method of replacing low quality spectator device recorded audio content by better-quality source device recorded audio content in media content recorded by the spectator device at an event, said media content recorded by the spectator device comprising synchronized audio content and video content of a part of the event, the method comprising the steps at a server of:
- receiving the media content recorded by the spectator device;
- based on fingerprint data associated with the audio content of the media content recorded by the spectator device, matching the audio content in said media content recorded by the spectator device with an associated portion of better-quality source device recorded audio content;
- replacing the audio content of the media content recorded by the spectator device with the associated matched portion of better-quality source device recorded audio content; and
- compiling the associated matched portion of better-quality source device recorded audio content with the video content of the media content recorded by the spectator device;
- wherein the compiled associated matched portion of better-quality source device recorded audio content with the video content of the media content recorded by the spectator device may be compiled with any one or more of photographs, content from content providers or brand material from sponsors; and
- wherein the photographs, content from content providers or brand material from sponsors is used to fill gaps in the video content of the media content recorded by the spectator device.

21. A method of replacing low quality spectator device recorded audio content by better-quality source device recorded audio content in media content recorded by the spectator device at an event, said media content recorded by the spectator device comprising synchronized audio content and video content of a part of the event, the method comprising the steps at a server of:
- receiving the media content recorded by the spectator device;
- based on fingerprint data associated with the audio content of the media content recorded by the spectator device, matching the audio content in said media content recorded by the spectator device with an associated portion of better-quality source device recorded audio content;
- replacing the audio content of the media content recorded by the spectator device with the associated matched portion of better-quality source device recorded audio content; and
- compiling the associated matched portion of better-quality source device recorded audio content with the video content of the media content recorded by the spectator device;
- wherein the compiled associated matched portion of better-quality source device recorded audio content with the video content of the media content recorded by the spectator device is overlaid with other spectator recorded audio content.

* * * * *